United States Patent [19]
Bosshard

[11] 3,952,202
[45] Apr. 20, 1976

[54] APPARATUS FOR IRRADIATING FLOWABLE MATERIAL

[75] Inventor: Ernst Bosshard, Winterthur, Switzerland

[73] Assignee: Sulzer Brothers Limited, Winterthur, Switzerland

[22] Filed: June 13, 1974

[21] Appl. No.: 479,115

[30] Foreign Application Priority Data
June 19, 1973 Switzerland............ 8862/73

[52] U.S. Cl................ 250/432 R; 250/435
[51] Int. Cl.² ........................... H01J 37/00
[58] Field of Search ........... 250/435, 436, 437, 438, 250/432, 428, 507, 454, 455

[56] References Cited
UNITED STATES PATENTS
2,514,909  7/1950  Strickland............ 250/507
3,602,712  8/1971  Mann................... 250/436
3,836,781  9/1974  Ellison................. 250/436

Primary Examiner—Craig E. Church
Attorney, Agent, or Firm—Kenyon & Kenyon Reilly Carr & Chapin

[57] ABSTRACT

The radiation sources of the mobile irradiation apparatus are mounted in a carrier which is mounted at the top of the irradiation chamber. A screening cover is disposed over the carrier and has a load-unloading passage which can be moved into alignment with a selected radiation-source containing passage in the carrier for loading and unloading purposes. The cover is secured in a closed position relative to the carrier via screws so that the load-unload passage is sealed with a passage in the carrier. The carrier is also movable relative to the cover via unloosening of the screws so that the cover can be brought to an open position in which the cover can rotate to bring the load-unload passage into alignment with a different passage in the carrier.

12 Claims, 5 Drawing Figures

APPARATUS FOR IRRADIATING FLOWABLE MATERIAL

This invention relates to an apparatus for irradiating flowable material and particularly a mobile apparatus for irradiating sewer sludge.

Heretofore, installations have been known for irradiating flowable material by means of radio-active sources. In some cases, the installations have been constructed with a material receiving irradiation chamber which is covered by a screening cover and which contains a carrier for a plurality of radiation sources, for example, as described in German Auslegeschrift No. 2,208,160. Generally, in order to replace the radiation sources in such an installation, the irradiation chamber has to be flooded. Where the installation is intended for fixed service, this is not a disadvantage. However, flooding is an undesirable necessity if the installation were to be used for a mobile irradiation plant.

Accordingly, it is an object of the invention to provide an irradiation apparatus which is mobile.

It is another object of the invention to provide an irradiation apparatus in which radiation sources are readily replaceable without any need to flood or flush the radiation chamber.

It is another object of the invention to provide an irradiation apparatus of simple mechanical construction.

Briefly, the invention provides an apparatus for irradiating flowable material. The apparatus comprises a material-receiving irradiation chamber, a carrier in the chamber having at least one receptacle including a plurality of passages for receiving radiation sources, and a rotatable screening cover for closing the chamber. In addition, a means is provided to move the receptacle between a closed (i.e. attached) position and an open (i.e. detached) position relative to the screening cover and the screening cover has a loading and unloading passage which, upon rotation of the cover when the receptacle is in the open (i.e. detached) position, is selectively placed in communication with a respective passage in the receptacle to permit movement of a radiation source therebetween. In addition, the apparatus includes a sealing means between the cover and receptacle for hermetically closing the passage in the receptacle to the irradiation chamber with the receptacle in the closed (i.e. attached) position.

The loading and unloading passage in the screening cover can thus only be moved from one passage in the carrier to another passage in the carrier when the receptacle is in the open position. When the receptacle is in the open position, the radiation sources can be readily replaced. When the receptacle is in the closed position, the sealing means prevents entry of any of the material being irradiated into the passages for the radiation sources. Consequently, the material to be irradiated which may be corrosive, cannot enter the receptacle interior. In addition, the radiation sources in the receptacle interior can readily be flushed by a coolant which can be guided by a suitable flushing means so as to remove gases evolved during irradiation.

Advantageously, to ensure that every place in the receptacle which is to receive a radiation source can be brought into communication with the closable passages of the cover, the receptacle is supported on the inside wall of the irradiation chamber and is secured against horizontal movement relative to the wall by a suitable means.

Where the receptacle is of ring-shape, i.e. a hollow circular ring with a vertically disposed axis, the sealing means is disposed in a seal-tight engagement between the top end face of the receptacle and the underside of the screening cover. The sealing means in this case can be provided by means of two ring-shaped gaskets which are disposed coaxially of the receptacle.

If a flushing means is provided to flush the radiation sources in the receptacle by a cooling medium, a third ring-shaped gasket is provided to define a pair of concentric annular chambers with the gaskets of the sealing means. Further, the flushing means includes a coolant supply passage in the cover to communicate with one annular chamber, a coolant removal passage in the cover to communicate with the other annular chamber and at least one communicating passage in the receptacle communicating one annular chamber with a bottom end of the radiation source passages in the receptacle.

Advantageously, to save space, the screening cover has at least one flow passage through which the material for irradiation is circulated between an interior space defined by the receptacle and the space remaining exteriorly of the receptacle within the irradiation chamber.

These and other objects and advantages of the invention will become more apparent from the following detailed description and appended claims taken in conjunction with the accompanying drawings in which:

Figure 4:
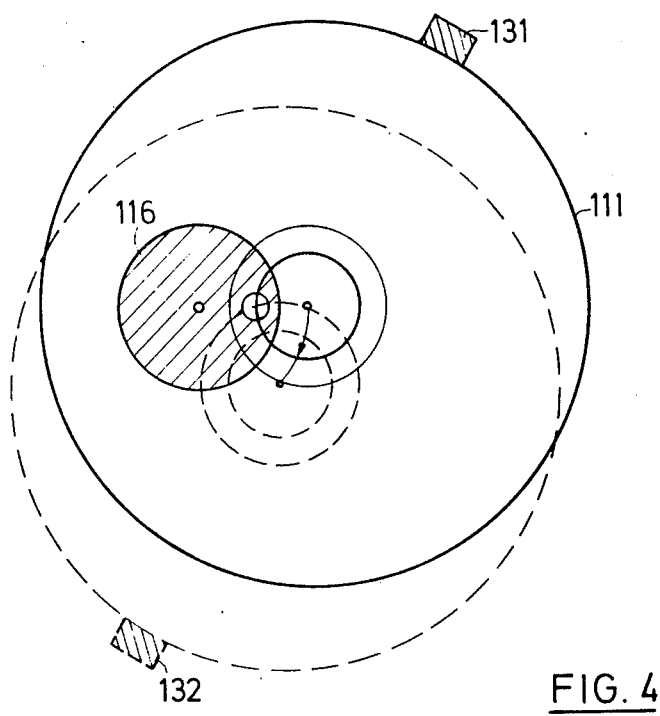
Figure 5:
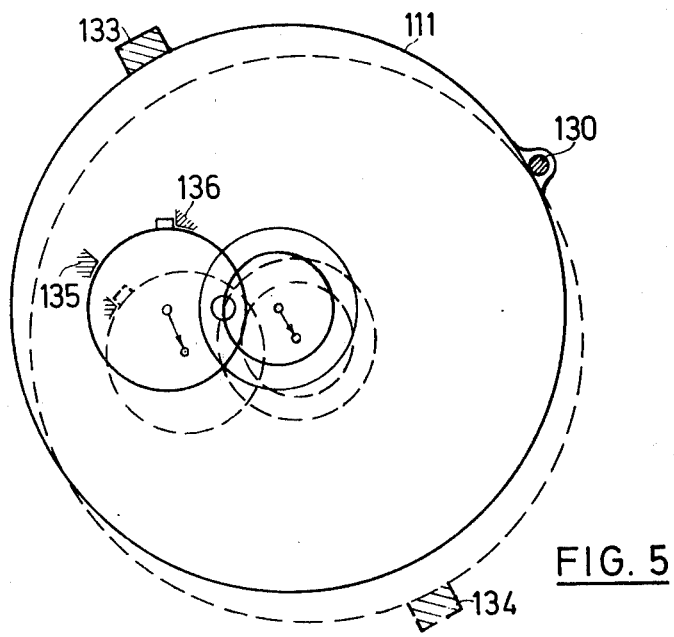

FIG. 3, which is also a view to an enlarged scale, illustrates a mounting of the screening cover;

FIG. 4 diagrammatically illustrates a manner of mounting a radiation source receptacle on the irradiation apparatus; and FIG. 5 diagrammatically illustrates a further manner of mounting a radiation source receptacle on the irradiation apparatus.

Figure 1:
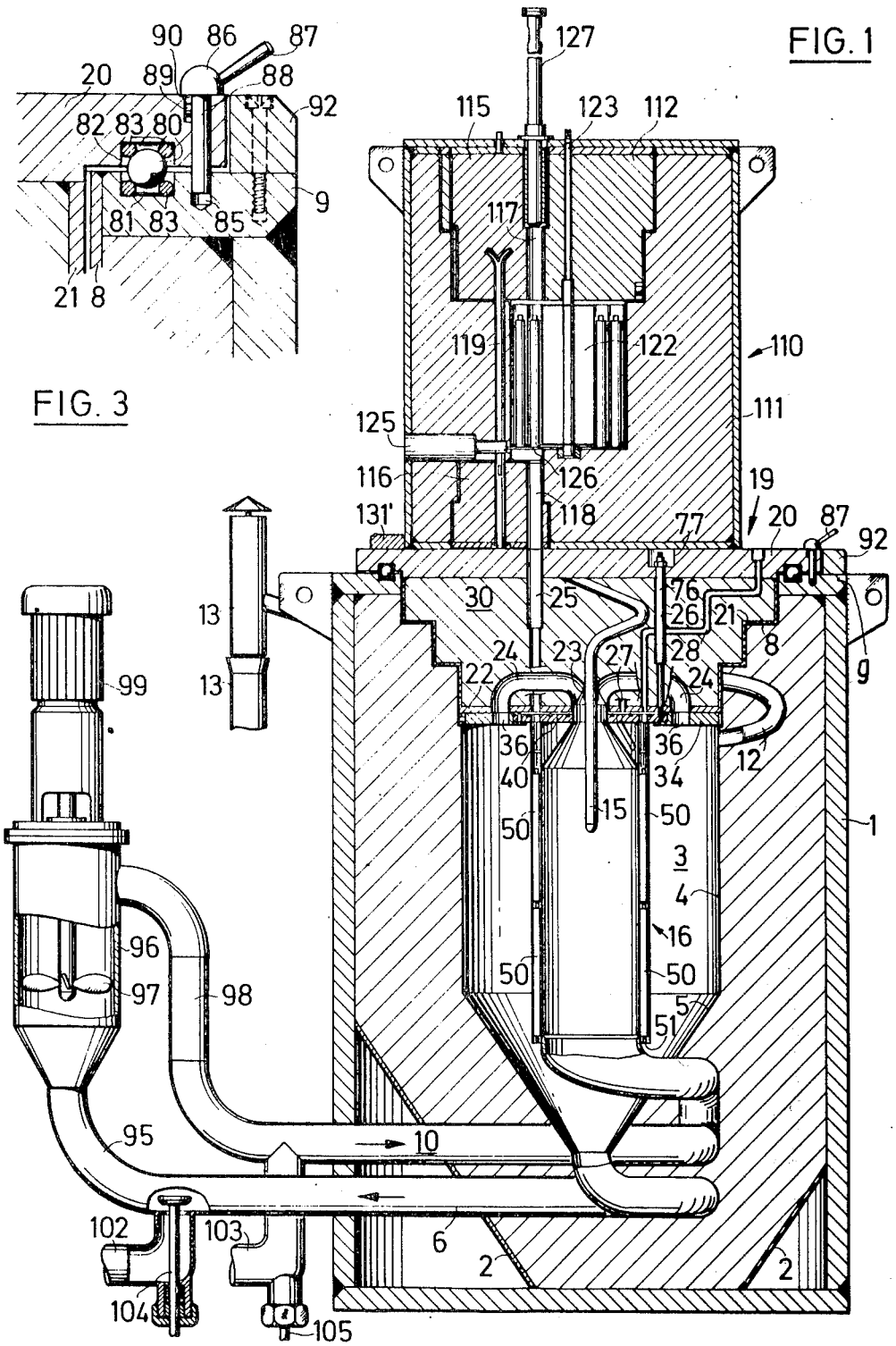
FIG. 1 illustrates a vertical section through a mobile form of irradiation apparatus according to the invention.

Referring to FIG. 1, a steel irradiation vessel 1 having a funnel-shaped insert 2 comprises an irradiation chamber 3 having a cylindrical wall 4, a funnel-shaped bottom part 5 and a curved exit tube 6. The wall 4, bottom part 5 and tube 6 are made of non-rusting steel. The wall 4 is connected by way of stepping 8 to a steel ring 9 which forms a top closure. A supply tube 10 extends through the wall of the vessel 1 with triple curvature into the funnel-shaped bottom part 5 of the chamber 3 where the pipe 10 opens upwardly in a flared shape.

An overflow pipe 12 is welded to the top end of wall 4 and extends, also sinuously, to an interrupted faller 13. The space remaining outside the pipes 6, 10, 13 between the vessel 1, insert 2, wall 4, bottom part 5, stepping 8 and ring 9 is potted with lead.

A screening cover 19 is mounted on the ring 9 via a ball-bearing. The cover 19 is formed by a circular disc 20, a sheet-metal body of rotation 21 which is adapted to the stepping 8 and which is suspended from the disc 20 and a horizontal plate 22 which is welded to the bottom of the body of rotation. The plate 22 has a central spigot 23 which tapers conically upwardly and to which four pipes 24 are connected in a cross. The ends of the pipes 24 are bent down to extend through the plate 22.

A pipe 15 is disposed in the spigot 23 coaxially thereof and extends to near the center of the chamber 3. The pipe 15 is closed at the bottom and extends sinuously to the disc 20, extends therethrough and terminates open. A vertical pipe 25 is disposed eccentrically in the space between the disc 20 and plate 22 and widens stepwise upwardly. Three other vertical pipes 26 are also disposed in the cover 19 (only one of which is shown). Each of these pipes 26 widens stepwise upwardly and is offset from one another by 120°, referred to the axis of disc 20.

The cover 19 also has a coolant supply pipe 27 and an air venting pipe 28, both of which extend in a number of convolutions from the plate 22 to the disc 20 and extend therethrough. A space 30 bounded externally by the plate 22, disc 20 and body 21 and internally by the pipes 15, 24–28 is filled up gaplessly with lead.

Figure 2:
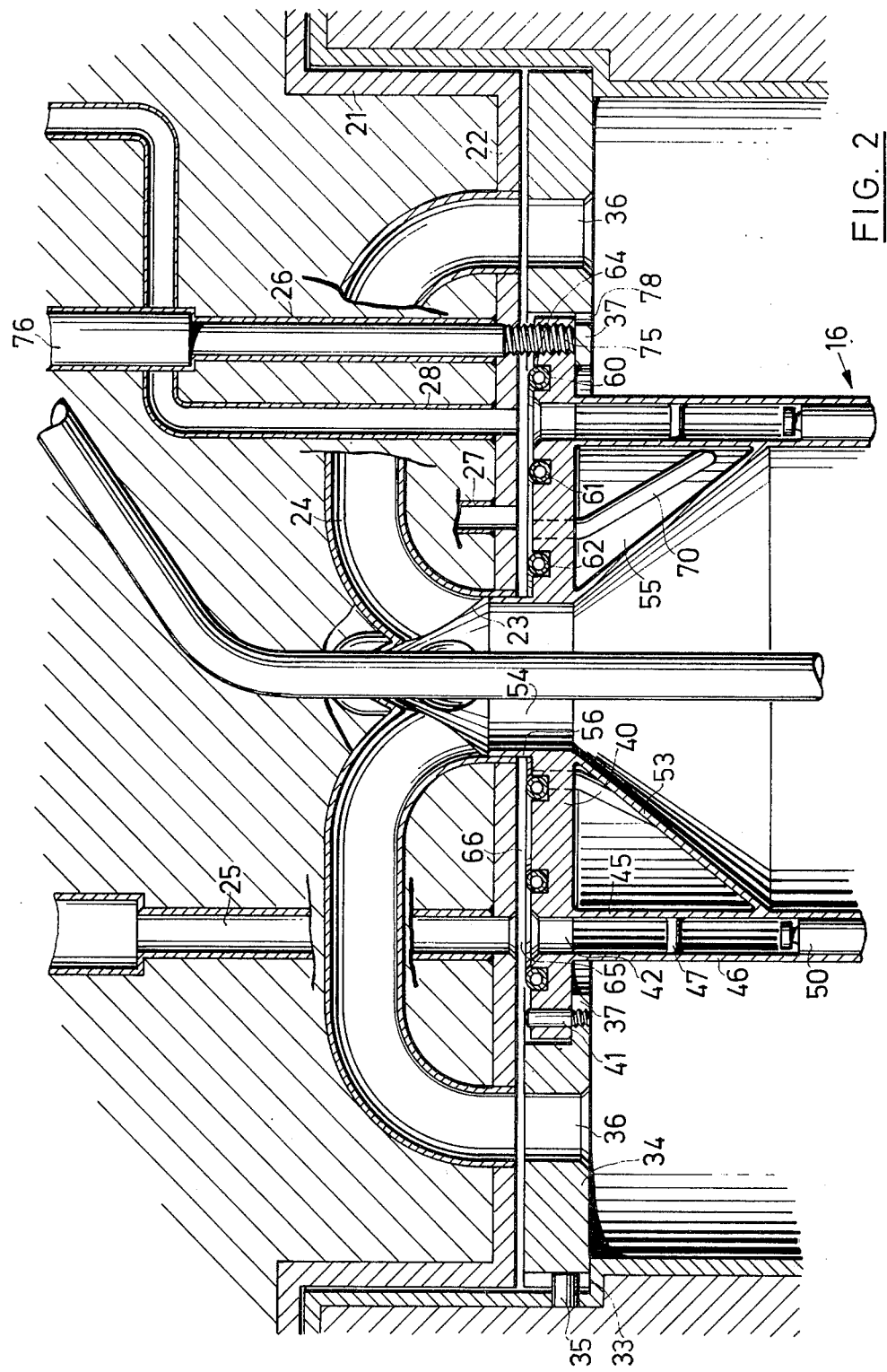
FIG. 2 illustrates a view to an enlarged scale of the top of the receptacle and the bottom of the screening cover of FIG. 1.

Referring to FIG. 2, a carrier for radiation sources is mounted in the chamber 3. The carrier includes a ring 34 disposed on a narrow shoulder 33 on the wall 4 and secured against rotation by an externally mounted locking pin 35 which catches in a radial slot in the ring 34. The ring 34 is formed with four passages 36 which are each aligned with the outer orifice of a pipe 24. Internally, the ring 34 has a shoulder 37 which carries a flange 40 of a receptacle 16. Two upright locking or catch pins 41 which secure the flange 40 against rotation are screwed into the shoulder 37. The flange 40 has a number of vertical passages 42 which are at the same distance from the flange axis as the stepped pipe 25 and which are at the same angular separation from one another. An inner (45) and an outer (46) cylindrical wall are welded to the underside of the flange 40, are tangential to the passages 42 and form the receptacle 16. The two walls 45, 46 are interconnected by spacer tubes 47 which also form guides for radiation source bars or rods 50 which are introduced through the passages 42 into the gap between the walls 45 and 46.

Referring to FIG. 1, the walls 45, 46 terminate in a hermatic weld with an annular base 51. The flared or trumpet-shaped end of pipe 10 is surrounded with only reduced radial clearance by the end of the receptacle 16 bounded by the walls 45, 46 and base 51. Instead of just a single receptacle 16, a number of receptacles can be provided in a circle.

Referring to FIG. 2, the carrier includes a wall 53 which narrows conically upwards and extends from the wall 45 to the bottom edge of a passage 54 in the flange 40, to bound a closed annular gap 55 having a triangular generatrix. The flange 40 has an upwardly directed spigot 56 at the center which engages with reduced radial clearance in the spigot 23. In addition, the flange 40 is formed on the top with three annular grooves 60–62 which extend coaxially of the receptacle 16. These grooves 60–62 receive a sealing means in the form of coaxial concentric annular metal O-rings 64. The three rings 64 define a pair of concentric annular chambers 65, 66. As shown, the stepped pipe 25 and the air venting pipe 28 extend downwardly into outer chamber 65 and the passage 42 extend upwardly into the outer chamber 65. The coolant supply pipe 27 extends downwardly into the inner chamber 66 and three fallers or communicating passages 70 extend upwardly into the chamber 66. The fallers 70 extend through the space 55, the wall 45 and the annular space between the walls 45 and 46 to a point near the receptacle base 51 where they terminate open. Three tapped apertures 75 are disposed coaxially of the pipes 26 on the periphery of the flange 40 and each is engaged by a stepped-shank screw 76 whose head is disposed in a recess 77 in the disk 20 (FIG. 1). A number of discharge passages 78 (FIG. 2) are distributed over the periphery of the inwardly extending edge of shoulder 37.

Referring to FIG. 3, the ball bearing 80 which rotatably mounts the cover 19 on the ring 9 is formed of two rectangular annular grooves 81, 82, each of whose inwardly projecting corners receive a wire ring 83. The ring 9 is formed, in registration with the annular spacing of the passages 42, with blind bores 85 in which a locking pin 88 associated with a boss 86 and handle 87 can engage. The pin 88 has a teat or the like 89 which can move vertically in a wedge-shaped way 90 in the disc 20. In addition, a block 92 is disposed on the periphery of the disc 20 which is rigidly connected to the ring 9 and which carries a pointer. The disc 20 has a circular graduation (not shown) which corresponds to the angular spacing of the apertures 85 and which gives an indication of the source position of the receptacle 16 which happens to be in alignment with the pipe 25.

In order to supply, circulate and discharge material to be irradiated to the chamber 3, a suitable means is connected to the supply and discharge pipes 6, 10. This means includes a circulating element 96 having a four-bladed propeller 97 disposed near the vessel 1 and connected to the discharge tube 6 via a connecting pipe 95. A connecting line 98 extends from the exit of element 96 to the supply tube 10. In addition, a motor 99 is provided to drive the propeller 97. Lines 102, 103 are connected to the lines 95, 96 and can be closed by way of valves 104, 105 respectively.

In order to supply or replace the radiation sources, a suitable carrying receptacle 110 is mounted on the vessel 1. As shown, the carrying receptacle 110 includes an outer screening member 111 and a cover 112 which is carried on the cover 19. A plug 115 is disposed in the cover 112 and a plug 116 is disposed in the bottom part of the screening member 111. Each plug 115, 116 is formed with a bore 117, 118 respectively, the bores being eccentric and being disposed on the same straight line, and the plugs are interconnected by way of a shaft 119. A turret 122 is disposed inside the carrying receptacle 110 which is adapted to receive rod-like radiation sources 50 in cells and which can be rotated from the outside by way of a shaft 123. A support blade 126 is disposed on the left-hand side of the receptacle 110 (as viewed) on a stepped pin 125 which selectively opens the bottom of one cell at a time of the inner or outer of the two circles of the turret 122.

A gripper device 127 is disposed in passage 117 in plug 115 which is used to engage the radiation sources present in the turret 122 and by way of the passage 118, tube 25 and one of the passages 42, to introduce such sources into or remove them from, the receptacle 16.

Operation is as follows:

The carrying receptacle 110 is raised, the vertical tube 25 is closed by means of a step-shaped screening plug or peg (not shown), and the screws 76 extending in the tubes 26 are tightened so that a seal-tight engagement is produced between the flange 40 and plate 22 by way of the gaskets 60–62 (FIG. 2), the filled receptacle 16 being raised from the open position shown to a closed position. With the valve 104 closed and the propeller 97 running, sewage sludge, for example, for irradiation is pumped through the line 103 into the circulatory system which is vented via line 12. When the circulatory system has been filled, valve 105 is closed and the sludge is circulated by means of the propeller 97 through lines 98, 10, the interior of receptacle 16, passage 54, the four pipes or tubes 24, the annular space remaining in the irradiation chamber outside the receptacle 16, the funnel 5, the lines 6, 95 and the circulating member 96. Sludge is kept out of the receptacle 16 and the pipes 25, 27, 28 by means of the gaskets 60–62.

Circulation is continued until the sludge has received the required dosage of radiation, whereafter the sludge is discharged through the line 102. A fresh batch can then be introduced into the circulatory system through line 103.

If the radiation sources are to be stored or changed, either because plant output is to be altered or the burnoff of the radiation sources is to be compensated, the circulatory system is first emptied, then flushed with clean water several times. The water used for washing is then removed, whereafter the screws 76 are unthreaded from the flange 40 so that the flange 40 and receptacle 16 are lowered onto shoulder 37. The cover 19 is then in a closed i.e. detached position relative to the receptacle 16. The stepped peg in the stepped passage 25 is removed and the carrying receptacle 110 is placed on disc 20, which can have locking pins 130 or abutments 131–134 (FIGS. 4 and 5) for this purpose.

In order to change a source 50, the bottom end of the gripper 127 is introduced through an empty place in turret 122 into receptacle 16, engages with the source to be exchanged, and lifts the source up into the turret 122 and deposits the source therein. The turret 122 is then turned until a new source 50 comes into alignment with the passage 118. Thereafter, the new source 50 is lowered through tube 25 into the receptacle 16. If action is required elsewhere in receptacle 16, the locking pin 88 of the handle 87 is raised, the member 89 moving out of the associated groove, and the pin 88 is turned so that the member 89 bears on the top plane surface of disc 20. Thereafter, cover 19 is rotated through the necessary angle by the required graduation mark of disc 20 being adjusted to the pointer on block 92. Thereafter, the handle 87 is turned, pin 88 dropping into the corresponding aperture thus locking the cover 19. The source can then be enchanged in the new position in the manner hereinbefore described.

It is noted that when the cover 19 is being rotated in the open position relative to the receptacle 16, the receptacle 16 remains stationary. Thus, the screws 75 are unthreaded from the flange 40 to permit rotation. Also, in order to bring the cover 19 back into the closed position, the cover 19 is rotated until the screws 75 are again aligned with the three threaded holes in the flange 40. The closing operation can then take place by threading the screws 75 into the flange 40 to raise the receptacle 16 into the attached position relative to the screening cover 19.

When the exchange of sources from the inner cell circuit of turret 122 has been completed and there are still sources to be exchanged in the outer cell circuit of turret 122, the plugs 115, 116 are turned to align passages 118 with the circle of outer sources. To this end, and as shown in FIG. 4, the plug 116 can be so connected by locking pins (not shown) to the cover 19 that passage 118 is coaxial of the tube 25. Thereafter, the carrying receptacle 110 can be rotated around the stationary plug 116, the passage 118 being in alignment with the inner or outer circle of the turret 122 in two discrete positions which can be adjusted by the carrying receptacle 110 being moved into engagement with one or the other of two abutments 131 or 132 secured to the cover 19.

Referring to FIG. 5, the carrying receptacle 110 can alternatively be pivotable around a pivot 130 near two abutments 133, 134 while the plugs 115, 116 are rotatable between two abutments 135, 136. When the carrying receptacle 110 is in engagement with abutment 133 and the plugs 115, 116 are also in abutment with the abutment 136, the axes of the tube 25 and of the passages 117, 118 are in alignment with the inner circle of the turret 122. However, when, and as shown in chain lines, the receptacle 110 is in engagement with the abutment 134 and the plugs 115, 116 are at this time in engagement with abutment 135, the axes of the tube 25 and of the passage 117, 118 are in alignment with the outer circle of the turret 122.

Upon the completion of source changing, the plugs 115, 116 are rotated approximately through a semi-circle and secured, the carrying receptacle 110 is raised, the screening plug or peg is introduced into the tube 25 and secured and the screws 76 are tightened, the flange 40 returning into seal-tight engagement with the plate 22.

In order to flush the passage in the receptacle 16 with a cooling means, the air discharge pipe 28 is used as a coolant removal passage. To this end, the flushing means includes the coolant supply pipe 27 which acts as a supply passage and which communicates with one annular chamber 66, the coolant removal passage 28 which communicates with the annular chamber 65 and the fallers 70 which communicates the chamber 66 with a bottom end of a radiation source passage in the receptacle 16. In operation, a coolant, preferably water, is introduced into the bottom of the receptacle 16 via the supply tube 27 and the fallers 70, and is discharged through the discharge pipe 28, the flow of water cooling the sources 50. The coolant also removes gases evolved as a result of ionization. As a rule, the supply of water is not interrupted at source changing, the water then going by way of the outlets 78 in the flange 40 and through chamber 3, discharge pipe 6 and line 102.

Referring to FIG. 1, a radiation measuring instrument for checking the intensity of radiation can be introduced through the tube 15 into the center of the receptacle 16. Also, irradiation tests can be made on specimens introduced through the tube 15.

What is claimed is:

1. An apparatus for irradiating flowable material comprising
   a material-receiving irradiation chamber;
   a screening cover on said chamber and having a passage for radioactive sources therethrough;
   a receptacle in said chamber including at least one position for receiving a radiation source, said receptacle being shiftable between an attached position and a detached position relative to said cover, and said screening cover being rotatable relative to said receptacle in said detached position to selectively communicate said passage with a respective position in said receptacle to permit transportation of a radioactive source therebetween; and
   connecting means for attaching said receptacle to said cover.

2. An apparatus as set forth in claim 1 which further comprises a wall surrounding said chamber and a shoulder on said wall for supporting said receptacle when said receptacle is in said detached position.

3. An apparatus as set forth in claim 1 further comprising sealing means between said cover and said receptacle for hermetically closing said receptacle with respect to said irradiation chamber.

4. An apparatus as set forth in claim 3 wherein said sealing means includes a pair of ring-shaped gaskets disposed coaxially of said receptacle between said receptacle and said cover.

5. An apparatus as set forth in claim 4 further comprising means for flushing said sources in said receptacle with a cooling medium, said means including a third ring-shaped gasket disposed coaxially of said receptacle between said receptacle and said cover wherein said gaskets define a pair of concentric annular chambers, said flushing means further including a coolant supply passage in said cover communicating with one of said annular chambers, a coolant removal passage in said cover communicating with the other of said annular chambers, and at least one passage in said receptacle communicating said one annular chamber with a bottom end of said receptacle.

6. An apparatus as set forth in claim 1 further comprising at least one channel in said cover for circulation of material to be irradiated between an interior space defined by said receptacle and a space exteriorly of said receptacle and within said irradiation chamber.

7. An apparatus as set forth in claim 1 wherein said receptacle is of annular ring-shape having a vertically disposed axis.

8. A mobile apparatus for irradiating flowable material comprising
a vessel having a material-receiving irradiation chamber therein;
a carrier in said chamber having an annular ring-shaped receptacle for a plurality of radiation sources, said receptacle including a plurality of vertically disposed passages for individually receiving a radiation source;
a screening cover for closing said chamber, said screening cover having a loading and unloading passage passing therethrough, said cover being horizontally rotatable relative to said carrier to selectively communicate said loading and unloading passage with a respective passage in said receptacle to permit movement of a radiation source therebetween;
screw means passing through said cover into selective engagement with said receptacle for moving said receptacle between a closed position and an open position relative to said cover; and
sealing means between said cover and said receptacle for hermetically closing said passages in said receptacle to said irradiation chamber with said receptacle in said closed position.

9. A mobile apparatus as set forth in claim 8 wherein said carrier is stationarily mounted in said vessel, and said receptacle is vertically movable relative to said carrier.

10. A mobile apparatus as set forth in claim 8 wherein said sealing means includes a pair of ring-shaped gaskets disposed coaxially of said receptacle between said receptacle and said cover.

11. A mobile apparatus as set forth in claim 10 further comprising means for flushing said passages in said receptacle with a cooling medium, said means including a third ring-shaped gasket disposed coaxially of said receptacle between said receptacle and said cover wherein said gaskets define a pair of concentric annular chambers, said flushing means further including a coolant supply passage in said cover communicating with one of said annular chambers, a coolant removal passage in said cover communicating with the other of said annular chambers, and at least one communicating passage in said receptacle communicating said one annular chamber with a bottom end of said radiation source passages in said receptacle.

12. An apparatus for irradiating flowable material comprising
a material-receiving irradiation chamber;
a screening cover for closing said chamber, said cover being rotatable with respect to said chamber and having a passage extending therethrough into said chamber;
a receptacle in said chamber including a plurality of passages therein for receiving radiation sources, said passages being disposed for selective communication with said passage in said cover upon rotation of said cover; and
means for moving said receptacle vertically between an attached position and a detached position relative to said cover.

* * * * *